United States Patent
Okamoto

(10) Patent No.: US 7,872,774 B2
(45) Date of Patent: Jan. 18, 2011

(54) IMAGE PROCESSING APPARATUS HAVING AN ENERGIZATION SWITCHING UNIT AND CONTROL INFORMATION UPDATING UNIT

(75) Inventor: Yuji Okamoto, Kyoto (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 963 days.

(21) Appl. No.: 11/729,772

(22) Filed: Mar. 30, 2007

(65) Prior Publication Data

US 2007/0236734 A1  Oct. 11, 2007

(30) Foreign Application Priority Data

Apr. 5, 2006  (JP) .............................. 2006-104485

(51) Int. Cl.
G06K 15/00  (2006.01)
G06F 3/12  (2006.01)

(52) U.S. Cl. ..................................... 358/1.16; 358/1.13

(58) Field of Classification Search .................. 358/1.1, 358/1.19, 1.14, 1.15, 1.16, 474, 486, 497; 399/36, 37, 70, 88, 89, 90; 700/22, 295, 700/297; 713/300, 320, 321, 330, 340
See application file for complete search history.

(56) References Cited

U.S. PATENT DOCUMENTS

| 5,729,667 | A | * | 3/1998 | Lee | ............................ 358/1.14 |
| 5,764,864 | A | * | 6/1998 | Sujita | ........................ 358/1.14 |
| 5,937,148 | A | | 8/1999 | Okazawa | |
| 6,459,496 | B1 | | 10/2002 | Okazawa | |
| 6,785,012 | B2 | | 8/2004 | Okazawa | |
| 6,950,953 | B2 | * | 9/2005 | Kizawa et al. | .............. 713/324 |
| 7,173,720 | B2 | * | 2/2007 | Nishizawa | ................. 358/1.14 |
| 7,308,216 | B2 | * | 12/2007 | Kishi et al. | .................... 399/70 |
| 7,340,626 | B2 | * | 3/2008 | Maitani | ....................... 713/323 |
| 7,782,498 | B2 | * | 8/2010 | Hoshi | ......................... 358/474 |
| 2002/0149789 | A1 | | 10/2002 | Okazawa | |

FOREIGN PATENT DOCUMENTS

| JP | 8-101606 A | 4/1996 |
| JP | 2000-267857 A | 9/2000 |
| JP | 2002-218099 A | 8/2002 |
| JP | 2002-259102 A | 9/2002 |
| JP | 2002-288066 A | 10/2002 |
| JP | 2003-63101 A | 3/2003 |
| JP | 2003-78671 A | 3/2003 |
| JP | 2005-186425 A | 7/2005 |

* cited by examiner

*Primary Examiner*—Gabriel I Garcia
(74) *Attorney, Agent, or Firm*—Birch, Stewart, Kolasch & Birch, LLP

(57) ABSTRACT

An image processing apparatus executes the processing of updating control information kept in the controlling units included in it without suspending an on-going processing and delaying the execution of a new processing request with less power consumption. When the controlling units are in a sleep mode or in non-energized state, NIC determines whether or not updating of firmware kept in each controlling unit is necessary by communicating with the information delivery server. The NIC controls an energization switching circuit to start up exclusively the controlling unit keeping the firmware determined necessary to be updated and replaces the firmware kept in the started controlling unit with the latest version of firmware obtained from the information delivery server.

10 Claims, 8 Drawing Sheets

FIG. 5

WEEKLY SCHEDULE                                                                                 WS

| | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Mon | | | | | | | | | | ** | ** | ** | ** | ** | ** | ** | ** | ** | ** | | | | | |
| Tue | | | | | | | | | | ** | ** | ** | ** | ** | ** | ** | ** | ** | ** | ** | ** | ** | | |
| Wed | | | | | | | | | | ** | ** | ** | ** | ** | ** | ** | ** | ** | ** | ** | ** | ** | | |
| Thu | | | | | | | | | | ** | ** | ** | ** | ** | ** | ** | ** | ** | ** | ** | ** | ** | | |
| Fri | | | | | | | | | | ** | ** | ** | ** | ** | ** | ** | ** | ** | ** | | | | | |
| Sat | | | | | | | | | | ** | ** | ** | ** | | | | | | | | | | | |
| Sun | | | | | | | | | | | | | | | | | | | | | | | | |

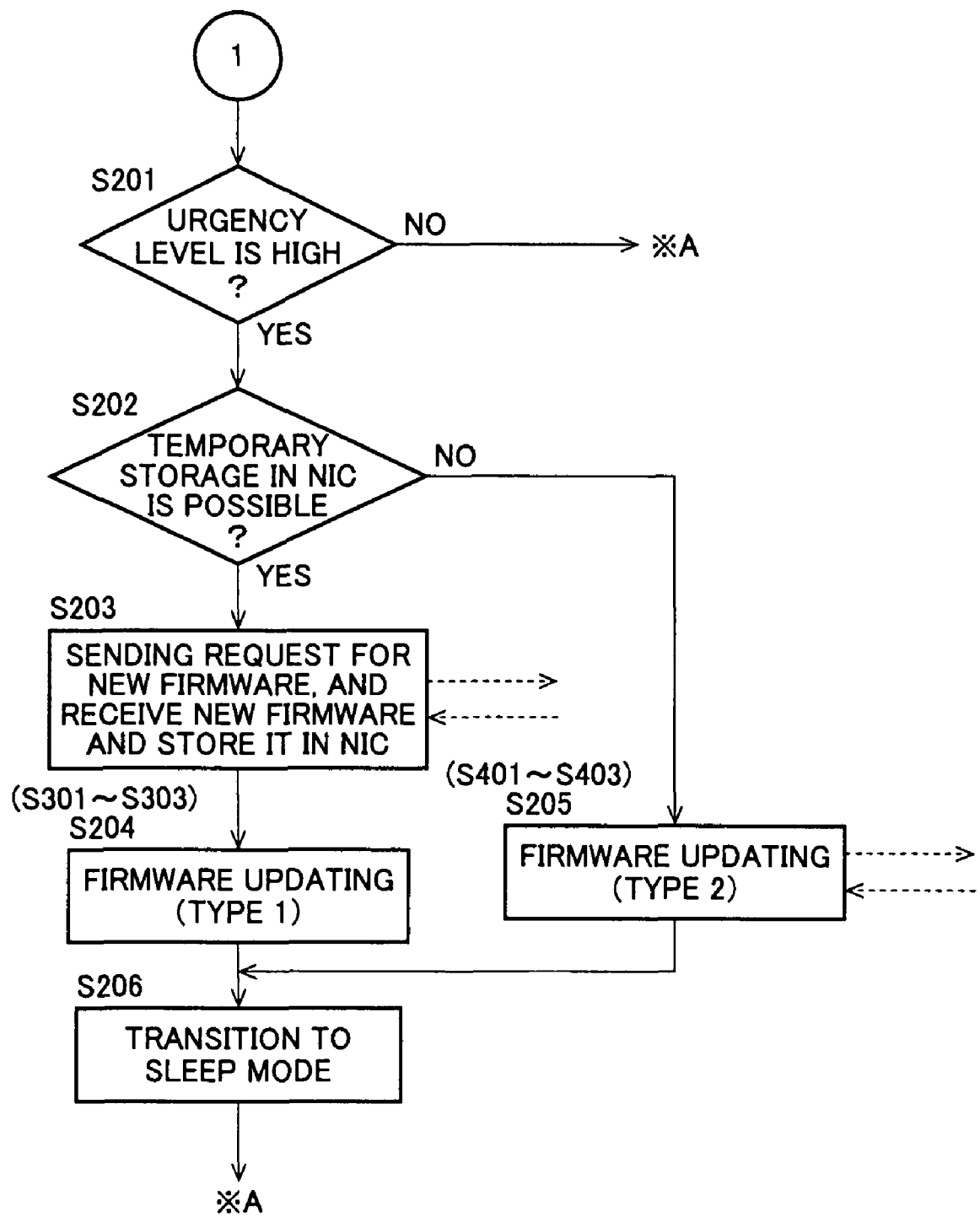

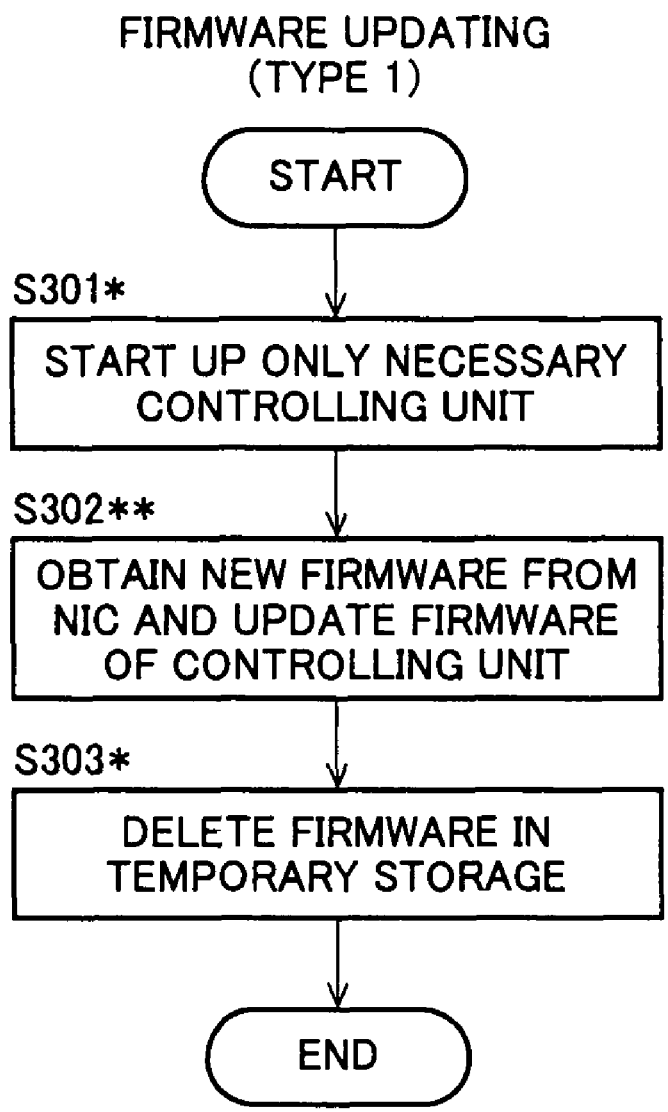

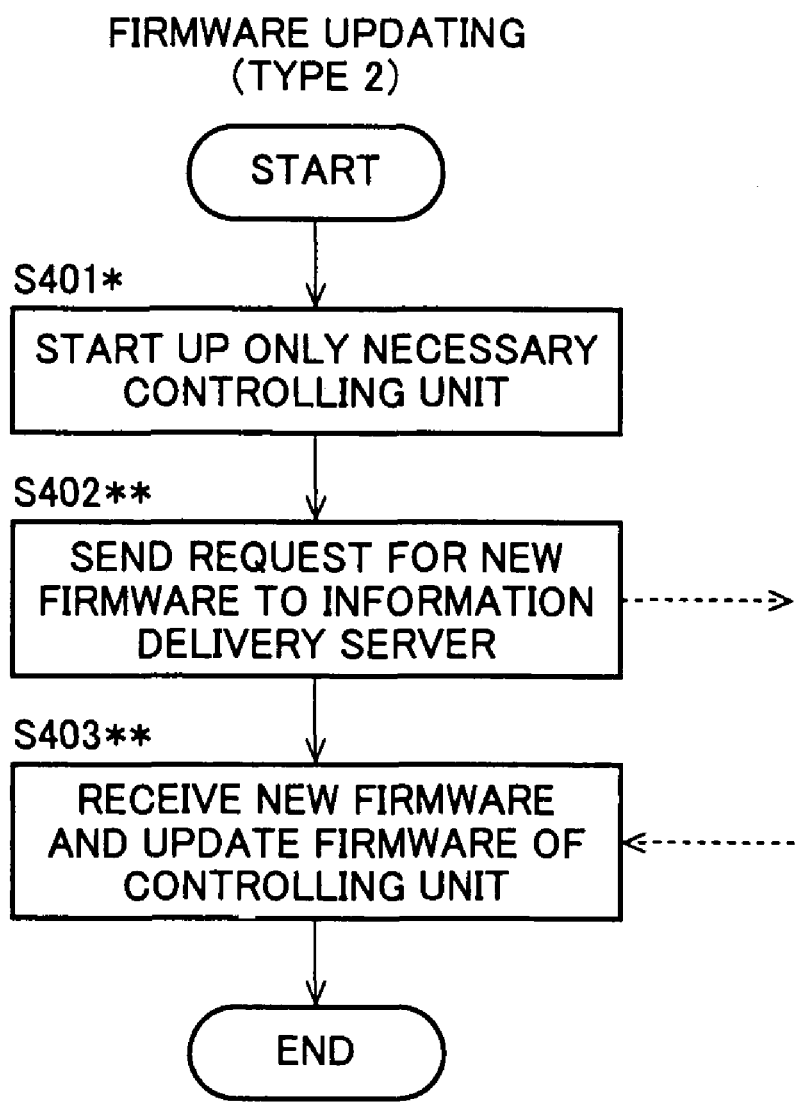

IMAGE PROCESSING APPARATUS HAVING AN ENERGIZATION SWITCHING UNIT AND CONTROL INFORMATION UPDATING UNIT

CROSS-NOTING PARAGRAPH

This Non-provisional application claims priority under 35 U.S.C. §119 (a) on Patent Application No. 2006-104485 filed in JAPAN on Apr. 5, 2006, the entire contents of which are hereby incorporated herein by reference.

FIELD OF THE INVENTION

The present invention relates to an image processing apparatus which includes a communication unit that communicates with an external device, and a controlling unit that controls devices based on a given control information.

BACKGROUND OF THE INVENTION

An image processing apparatus, such as a multi-function machine including a printer, scanner, facsimile machine, and copier or functions thereof, generally includes a communicating unit (such as a NIC (Network Interface Card) or a modem (Modulator-Demodulator)) that communicates with an external apparatus (such as a computer or other image processing apparatuses) through a communication medium such as a network or telephone lines. Some of such image processing apparatuses include a function (hereinafter, a sleep function) for shifting into a power-saving state (generally, a sleep mode) with lower power consumption than a normal operation state if a predetermined sleep condition is satisfied in the normal operation state.

The sleep condition includes, for example, a condition that no operation is performed for an operation input unit included in the image processing apparatus and no data are received from an external apparatus through the communicating unit for a certain time period or more. In other cases, the sleep condition may include a condition that the current time is within a time zone set in a predetermined time schedule (e.g., weekly schedule).

In the power-saving state, for example, energization (power supply) is cut off to the devices such as a fixing apparatus including a heater and a control circuit, while the communicating unit is often maintained in an energized state. This is because in the power-saving state, energization of devices in non-energized state is automatically resumed according to a request from an external apparatus to allow the devices to automatically return to the normal operation state. For example, in an image forming apparatus shown in Japanese Laid-Open Patent Publication No. 8-101606, when an energized communicating unit receives a print request in a power-saving state, the entire apparatus is energized to form an image in accordance with the received print request.

In an image forming apparatus shown in Japanese Laid-Open Patent Publication No. 2005-186425, when an energized controller receives an access request for a hard disk from an external apparatus through a network in a power-saving state, energization of the hard disk is started to perform the requested processing.

In an MFP (Multi Function Peripheral) shown in Japanese Laid-Open Patent Publication No. 2003-063101, when a print request is received through an external interface in a power saving state where a sub-CPU and the external interface are supplied with electric power from a subpower supply, the sub-CPU supplies electric power to a main CPU that controls the entire apparatus to perform printing.

An image processing apparatus usually includes a plurality of controlling units. Each controlling unit has a memory unit that keeps control information, such as firmware (program), control parameters, etc., and carries out control over various devices (control through execution of programs and reference to the control parameters) on the basis of the control information. The controlling unit, for example, includes a print controlling unit that controls a device related to image formation (printing), a scan controlling unit that controls a device related to reading of a document image, a post-processing controlling unit that controls a device carrying out a post-processing, such as punching and stapling, on a recording paper bearing an formed image, and a main controlling unit that executes overall control over the above local controlling units.

The image processing apparatus may has a function of obtaining the latest version of control information from an external server, which keeps the latest version of control information, through an NIC and replacing control information kept in the controlling unit with the latest version of control information (hereinafter, called a control information download function) when a version up is executed for the control information kept in the controlling unit is present.

For example, Japanese Patent Application Laid-Open Publication No. 2002-288066 discloses a system operating in such a way that a computer in a service center transmits the latest version of control information (firmware) to a copier via a communication controller connected to the copier to update control information kept in the copier.

Usually, a controlling unit of an image processing apparatus is incapable of performing normal control processing while updating control information (programs and control parameters) kept in the controlling unit.

This leads to such a trouble that processing in progress is suspended or execution of a new processing request is delayed due to updating the control information when updating of the control information is carried out in a situation where an image processing is in progress or a request for execution of the image processing seems to be raised with high possibility.

If the image processing apparatus carries out a control information updating processing in a time zone during which the image processing apparatus rarely works (at night, on holiday, etc.), the controlling unit must be kept in energized state until such time zone and therefore, there is a problem that the electric power is consumed wastefully.

SUMMARY OF THE INVENTION

The object of the present invention is to provide an image processing apparatus that can update the control information kept in a controlling unit of the apparatus suppressing the power consumption in the apparatus as much as possible without suspending the processing in progress or delaying the execution of the request for new processing.

The present invention applies to an image processing apparatus having a memory unit that keeps firmware (computer program), control parameters, etc., (hereinafter collectively called "control information") used for the control of the image processing apparatus, a controlling unit that controls a given device on the basis of the control information, and a communication unit that communicates with a given external device that keeps the control information to be supplied to the controlling unit. The image processing apparatus according to the present invention includes the following elements described in (1) to (5).

(1) Controlling unit energization switching unit that practices the switching over energizing/non-energizing for the controlling unit independently of the energization of the communication unit.
(2) Version information memory unit that stores version information (information indicating the version of control information) on control information kept in the controlling unit.
(3) Updating necessary/unnecessary determining unit that determines whether updating of the control information kept in the controlling unit is necessary or not by referring to the information stored in the version information memory unit and communicating with the external device via the communication unit when the controlling unit is in a non-energized state.
(4) Controlling unit automatic starting unit that switches the controlling unit into an energized state by controlling the controlling unit energization switching unit when the updating necessary/unnecessary determining unit determines that updating of the control information is necessary.
(5) Control information updating unit that obtains new control information from the external device via the communication unit and replaces the control information kept in the controlling unit which has been switched into the energized state by the controlling unit automatic starting unit with the new control information when the updating necessary/unnecessary determining unit determines that updating of the control information is necessary.

The image processing apparatus having the above configuration starts a control information updating processing when the controlling unit is in the non-energized state (power-saving state where the controlling unit is supplied with no power), where the image processing apparatus is not executing an image processing. This prevents a trouble that an ongoing image processing is suspended due to the execution of the control information updating processing.

Generally, an image processing apparatus gets into the power-saving state when a possibility of a newly arising image processing request is low or when the apparatus is in a state of rejecting a new image processing request. Since the image processing apparatus according to the invention starts the control information updating processing when it is in the power-saving state, the possibility that the execution of a new image processing request is delayed due to the control information updating processing is low.

The image processing apparatus having the above configuration determines whether or not updating of control information is necessary while it is in the power-saving state, where the controlling unit is not supplied with power, and automatically starts up the controlling unit as required to execute the control information updating processing. This allows the image processing apparatus to maintain the power-saving state until night or early morning when an image processing request rarely arises, if the control information updating processing is carried out during that time. As a result, the power consumption in the image processing apparatus is reduced substantially.

The controlling unit may be composed of one or more controlling units which can be switched individually into energizing/non-energizing state by the controlling unit energization switching unit. In this case, each of the updating necessary/unnecessary determining unit, control unit automatic starting unit, and control information updating unit executes its processing separately to each of the controlling units.

In this manner, starting up only the controlling unit in a need of updating control information (switching the controlling unit into the energized state) avoids wasteful power consumption in other controlling units.

The control information updating unit may have a first control information updating unit that obtains the new control information via the communication unit and updates the control information kept in the controlling unit after the controlling unit is switched into the energized state by the control unit automatic starting unit.

As a result, the controlling unit which is started up from the power-saving state can provide the first control information updating unit and the power consumption in the energy-saving state is reduced.

The data transmitting speed between devices in the image processing apparatus (here, data transmitting speed between the communication unit and the control unit is considered) is usually faster than that between the communication unit and the external device. This is because the data transmission between the devices in the image processing apparatus is executed through a high-speed data transmitting unit, such as bus. Besides, when a version up of control information is executed, more devices in the image processing apparatus access the external device, and therefore, the communication traffic between the communication unit and the external device increases and a data transmission rate between them decreases.

The image processing apparatus according to the present invention, therefore, should preferably include a control information temporary memory unit that temporarily stores the new control information obtained from the external device. In this case, the control information updating unit has a second control information updating unit that obtains the new control information via the communication unit and stores it in the control information temporary memory unit before the control unit is switched into the energized state by the control unit automatic starting unit, and replaces the control information kept in the controlling unit switched into the energized state with the new control information stored in the control information temporary memory unit.

This makes it possible to keep the controlling unit in the energized state short to update the control information, and the power consumption in the image processing apparatus is reduced.

When the control information temporary memory unit with a sufficiently large memory capacity is employed to deal with a case where, for example, control information of each of the controlling units is updated simultaneously, the control information temporary memory unit consumes a greater amount of power. Employing the control information temporary memory unit with a relatively smaller memory capacity, on the other hand, may result in a shortage of a spare capacity of the memory unit.

The image processing apparatus, therefore, may include both first and second control information updating unit, and further include a control information updating controlling unit that obtains size information of control information for the controlling unit from the external device via the communication unit, and makes a choice on which of the first or second control information updating unit is used to obtain and update the new control information based on a comparison of the size information and a spare capacity of the control information temporary memory unit.

This offers a power-saving effect resulting from the control information temporary memory unit incorporated into the image processing apparatus, and also enables updating of control information even if the spare capacity of the memory unit is insufficient.

The image processing apparatus according to the present invention may further include the following constituent elements described in (6) to (8).

(6) Schedule controlling unit that controls the energization state of the controlling unit by controlling the controlling unit energization switching unit according to a predetermined time schedule.

(7) Schedule control state determining unit that determines whether the controlling unit, when it is in non-energized state, has been brought into the non-energized state by the schedule controlling unit.

(8) Updating execution controlling unit that controls a determination on execution or nonexecution of a processing each by the controlling unit automatic starting unit and the control information updating unit based on a determination result given by the schedule control state determining unit when the updating necessary/unnecessary determining unit determines that updating of control information is necessary.

As described before, a condition of no operation input or data reception continued for a given consecutive time or longer may be one of conditions of shifting the image processing apparatus into the power-saving state (the sleep condition). However, when the image processing apparatus is in the power-saving state due to this sleep condition, it is unpredictable when a new image processing request arises. Therefore, a new image processing request could arise during updating of control information.

On the other hand, if the image processing apparatus is in the power-saving state according to the predetermined time schedule, the time when the image processing apparatus returns (starts) from the power-saving state to the state to be ready for receiving a new image process request can be specified. Therefore, the image processing apparatus including the above constituent elements described in (6) to (8) is capable of executing the control information updating processing at the time when no arising of a new image processing request is certain when the control unit is put into the non-energized state by the schedule controlling unit. Thus, the image processing apparatus according to the invention prevents a new image processing request from being delayed due to the execution of the control information updating processing.

The image processing apparatus including the above constituent elements described in (6) to (8) may further include an updating urgency level determining unit that determines the urgency level of updating of control information when the updating necessary/unnecessary determining unit determines that updating of the control information is necessary.

In this case, the updating execution controlling unit controls a determination on execution or nonexecution of a processing by the controlling unit automatic starting unit and by the control information updating unit based on a determination result given by the schedule control state determining unit and a determination result given by the updating urgency level determining unit when the updating necessary/unnecessary determining unit determines that updating of control information is necessary.

The image processing apparatus having the above configuration is capable of executing updating of control information of which the updating urgency level is high even when the controlling unit has been brought into the non-energized state not by the schedule controlling unit (e.g., when the controlling unit has been in the power-saving state according to the sleep condition of no operation input or data reception continued for a given consecutive time or longer).

The controlling unit automatic starting unit of the image processing apparatus having the above elements described in (6) to (8) may switch the controlling unit into the energized state a given time before a next startup scheduled time of the controlling unit determined by the schedule controlling unit.

This image processing apparatus can finish the updating processing on control information of the controlling unit virtually at the same time of the next startup scheduled time of the controlling unit determined by the schedule controlling unit. That is, if the controlling unit is kept in the energized state from the end of updating processing until the next startup scheduled time determined by the schedule controlling unit, the power in the image processing apparatus consumed during that period can be reduced to the minimum.

The image processing apparatus may also include a controlling unit automatic suspending unit that switches the controlling unit into the non-energized state by controlling the controlling unit energization switching unit after the control information kept in the controlling unit has been updated by the control information updating unit. In this case, the schedule controlling unit starts up the controlling unit again when the next startup scheduled time has arrived.

Many electronic devices, however, consume a greater amount of power at the start of energization than that for maintaining the energized state. For this reason, as described before, the power consumption may be smaller when the controlling unit is kept in the energized state until the next startup scheduled time determined by the schedule controlling unit after the control information updating processing is ended than when the controlling unit is once suspended and started up again.

The communication unit may have both functions of the updating necessary/unnecessary determining unit and the controlling unit automatic starting unit.

This allows further reduction in power consumption of the image processing apparatus in the power-saving state.

The updating necessary/unnecessary determining unit may execute, for example, the following determination processing.

One of examples is to obtain version information of the control information kept in the external device from it via the communication unit and to determine whether or not updating of the control information is necessary by comparing the obtained information and the information stored in the version information memory unit. This is an example that the image processing apparatus performs a version comparison of the control information retained by the image processing apparatus with the control information retained by the external device.

Another example is to transmit the information stored in the version information memory unit to the external device via the communication unit and determine whether or not updating of control information is necessary based on the information that is sent back from the external device as a replay to the transmitted information. This is an example that the external device performs the version comparison.

BRIEF DESCRIPTION OF THE DRAWINGS

FIG. 5 is a diagram of the weekly schedule of the weekly timer control in the image processing apparatus X;

FIG. 7 is a flowchart representing the rest of the procedures of firmware download processing in the image processing apparatus X;

FIG. 8 is a flowchart representing a processing procedure of firmware updating processing that is a part of firmware download processing (type 1); and FIG. 9 is a flowchart representing a processing procedure of firmware updating processing that is a part of firmware download processing (type 2).

PREFERRED EMBODIMENTS OF THE INVENTION

Embodiments of the present invention will now be described with reference to the accompanying drawings to facilitate understanding of the present invention. The following embodiments provide examples embodying the present invention, and should not be construed as a limitation to the technical scope of the present invention.

Figure 1:
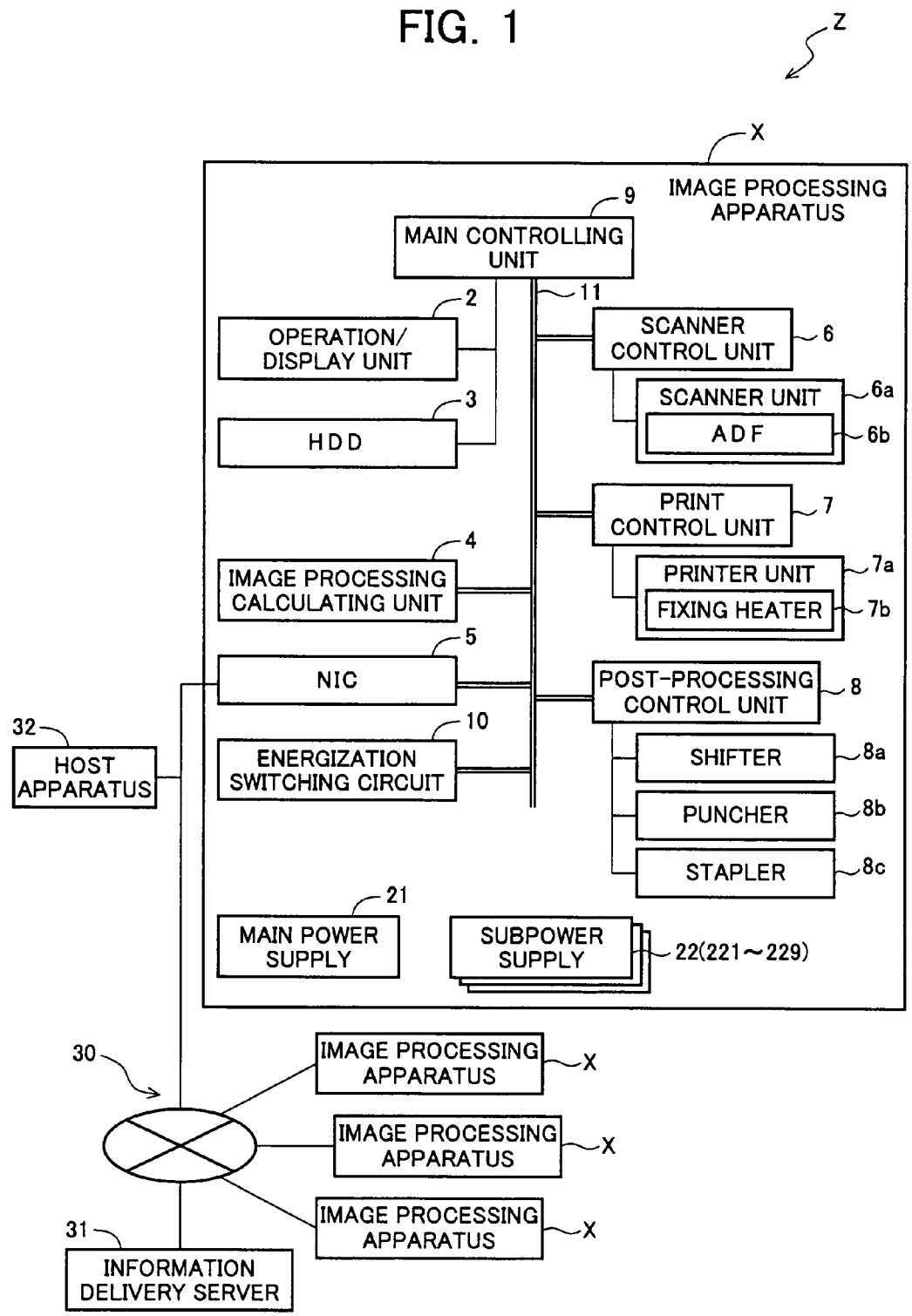
FIG. 1 is a block diagram of the general configuration of an image processing apparatus X according to an embodiment of the present invention and of a network system including the image processing apparatus X as a constituent element.

FIG. 1 is a block diagram showing the general structure of the image processing apparatus X according to the embodiment of the present invention and of the network system Z including the image processing apparatus X as a constituent element. The network system Z includes one or more image processing apparatuses X, and an information delivery server 31 that can communicate with each image processing apparatus X via a network 30, such as LAN and the Internet.

The image processing apparatus X includes one or more controlling units 6 to 9 each of which has a memory unit keeping firmware used for controlling (program for executing various control processing: an example of control information). The image processing apparatus X has a function that automatically obtains the latest version of the firmware from the information server 31 via the network 30 and updates the firmware kept in the controlling units 6 to 9 when version up of the firmware is executed. While this embodiment presents a case where the object of updating is the firmware kept in the controlling units 6 to 9, the firmware may be replaced with other control information, such as control parameters, in another embodiment.

[Image Processing Apparatus X]

The image processing apparatus X is structured to be capable of communicating with the information delivery server 31 (an example of the external devices) via the network 30 such as a LAN and Internet, and includes a network interface card 5 (hereinafter, called NIC) as an example of the communication circuit that performs the communication. The information delivery server 31 is a computer including a function of Web server.

As shown in FIG. 1, the image processing apparatus X comprises, in addition to the NIC 5, an operation/display unit 2, a hard disk drive (hereinafter, called HDD) 3, an image processing calculating unit 4, a scanner control unit 6, a scanner unit 6a, a print control unit 7, a printer unit 7a, a post-processing control unit 8, a shifter 8a, a puncher 8b, a stapler 8c, a main control unit 9, an energization switching circuit 10, a main power supply 21, subpower supply 22, etc.

The scanner unit 6a is equipped with an automatic document feeder (hereinafter, called ADF) 6b, and the printer unit 7a is equipped with a fixing heater 7b.

In the example of FIG. 1, the main control unit 9, the image processing calculating unit 4, the NIC 5, the scanner control unit 6, the print control unit 7, the post-processing control unit 8, and the energization switching circuit 10 are connected each other by a bus 11.

The operation/display unit 2 comprises an operation input unit for inputting information and a display unit for displaying the information. The operation input unit is composed of, for example, a sheet key, a touch panel provided on the surface of a liquid crystal display apparatus, etc. The display unit is composed of, for example, the liquid crystal display apparatus, a LED lamp, etc. This operation/display unit 2 constitutes a man-machine interface for the user.

The HDD 3 is a large-capacity nonvolatile memory that stores the data as required at the time of processing of the image data read from a document or print processing of image data. The HDD 3 is also used to save data files transmitted from the host apparatus 32 in response to a request from the host apparatus 32 that is a personal computer capable of communicating with the image processing apparatus X. A data filing processing hereinafter indicates the processing of saving the data files transmitted from the host apparatus 32 in the HDD 3 and processing of changing the saving locations (data folders) of the saved data files, changing file names, rewriting data, erasing data, etc.

The image processing calculating unit 4 includes a signal processing circuit for the use of it only or a DSP (Digital Signal Processor), performs various types of image processing of image data, generates print data (such as image data and print job) used for image formation, generates image data (e.g., image data encoded in a predetermined format such as a JPEG format) to be transmitted to the host apparatus 32, and performs processing of encrypting an image data, decrypting the encrypted image data, compressing and encoding an image data, or decompressing (restoring) the compressed and encoded image data.

The scanner control unit 6 outputs a control signal to the scanner unit 6a and the ADF 6b that perform processing of reading an image from a document to control the scanner unit 6a and the ADF 6b.

The scanner unit 6a is a device that reads an image formed on a document from a document placed on a contact glass (not shown) or from a document conveyed by the ADF 6b. The scanner unit 6a is disposed with, for example, a light source that applies light to the image surface of the document and a mirror that reflects the reflected light from the document to a predetermined direction, in addition to the ADF 6b, and includes a movable optical unit formed to move along the document, a motor (an example of a driving unit) that drives the movable optical unit, a fixed mirror that guides the light emitted from the movable optical unit along a predetermined path, a lens that focuses the light, a CCD (Charge Coupled Device) that performs photoelectric conversion of the light passed through the lens to output an electric signal in proportion to the amount of the light (i.e., light reflected by the image surface of the document), etc. When an image is read from the document placed on the contact glass, the movable optical unit applies light to the image surface moving along the document. On the other hand, when an image is read from the document conveyed by the ADF 6b, the movable optical unit is fixed to a predetermined position facing to the conveying path of the document and applies light to the document being conveyed. The electric signal output from the CCD is transmitted as image data to the image processing calculating unit 4.

The ADF 6b is a device that conveys documents set in a document supply tray one-by-one along a predetermined conveying path to discharge the documents to a document discharge tray. The ADF 6b includes a paper feeding roller that sends documents from the document supply tray one-by-one to the document conveying path, a document conveying roller that conveys the documents through the document conveying path, and a motor that drives the rollers, for example.

The print control unit 7 outputs a control signal to the printer unit 7a that performs processing that relates to the image forming processing to control the printer unit 7a.

The printer unit 7a sequentially sends recording paper sheets contained in a paper feeding cassette not shown one-by-one to convey the recording paper sheets through a predetermined image forming position to a paper discharging tray and forms (outputs) images on the recording paper sheets at the image forming position based on the document image data read by the scanner unit 6a from the document and print data generated by the image processing calculating unit 4 and the like. The image processing apparatus X functions as a copier by performing an image forming processing based on the image data on the document and functions as a printer by performing an image forming processing based on a print request (print job) received from the host apparatus 32.

The printer unit 7a includes a photoconductor drum that carries an image, a charging device that charges the photoconductor drum, an exposing device that writes an electrostatic latent image onto the photoconductor drum surface based on the given image data or print job, a developing device that develops the electrostatic latent image to a toner image, a transferring device that transfers the toner image on the photoconductor drum to the recording paper sheet, and a motor that drives the photoconductor drum and rollers for conveying the recording paper sheet, for example.

The printer unit 7a also includes a fixing device that heats and fixes the toner image transferred to the recording paper sheet, and the fixing device includes a heating roller including a fixing heater 7b therein, a pressing roller that presses the recording paper sheet with the transferred toner image against the heating roller, a motor that drives the rollers, etc.

The post-processing control unit 8 outputs a control signal to the shifter 8a, the puncher 8b, and the stapler 8c that perform various types of post-processing to the recording paper sheet on which the image has been formed to control the shifter 8a, the puncher 8b, and the stapler 8c.

The shifter 8a includes a movable tray disposed with one or more paper discharging trays and sorts the recording paper sheets in accordance with a predefined rule when the printer unit 7a sequentially performs the image forming processing of one or more sets of sheets for a group of image data or print jobs (hereinafter, called a set of jobs). The movable tray can shift positions of the paper discharging trays corresponding to recording paper discharging outlets.

For example, the shifter 8a controls the movable tray so that the recording paper sheets with the formed image are discharged to each paper discharging tray corresponding to every set of jobs or each of the same pages, respectively. The puncher 8b performs processing of forming punch holes in the recording paper sheets with the formed image. The stapler 8c performs staple binding processing for the recording paper sheets with the formed image. The shifter 8a, the puncher 8b, and the stapler 8c are hereinafter collectively referred to as post-processing executing units.

With regard to the scanner control unit 6, the print control unit 7, and the post-processing control unit 8 that respectively control the scanner unit 6a, the printer unit 7a, and the post-processing executing units 8a to 8c that directly and respectively perform each type of individual processing of the image reading and the image forming, and the post-processing for the recording paper sheets, these control units are hereinafter collectively referred to as local control units.

The NIC 5 is a communication interface (an example of a communication circuit) that sends and receives data to and from the information delivery server 31 through the network 30, which is composed of, for example, a LAN conforming to the IEEE standard 802.3, the Internet, etc. The NIC 5 executes the processing of, for example, transmitting image data generated by the image process calculating unit 4 or read by the scanner unit 6a or data stored in the HDD 3, to a host apparatus 32, which is a personal computer, etc., connected to the network 30, and also executes the processing of receiving various requests for data processing from the host apparatus 32. The requests for the data processing include a print request for requesting image formation on a recording paper (what is called print job), a scan request for requesting image reading from a document, and a data filing request for requesting a data filing processing.

The main power supply 21 and the subpower supply 22 are power circuits that supply electric power to each of the constituent elements of the image processing apparatus X. The energization switching circuit 10 is the switching circuit that switches the electric current on and off to the each of function blocks including the main controlling unit 9 and other controlling units 6 to 8 by controlling connection and disconnection of a commercial power supply to one of the subpower supply 22 according to a control signal coming from the NIC 5. The energization switching circuit 10 is capable of switching each of the controlling units 6 to 9, separately and independently of switching the NIC 5 (an example of controlling unit energization switching unit).

The main control unit 9 controls each of the operation/display unit 2, the HDD 3, and the image processing calculating unit 4 and gives/receives to/from each of the scanner control unit 6a, the print control unit 7, and the post-processing control unit 8 the information necessary for the data processing performed by each of the control units and the information acquired from the data processing.

For example, the main control unit 9 delivers to the print control unit 7 the information such as a size of a recording paper sheet on which an image is formed, a magnification ratio and a density correction value of the output image, and whether color image forming processing or monochrome image forming processing is performed, while the main control unit 9 acquires from the print control unit 7 the information about how many recording paper sheets are completed in the image formation processing, the information about errors occurred in the printer unit 7a, etc. The main control unit 9 delivers to the scanner control unit 6 the information of an image reading range in a document, etc., while the main control unit 9 acquires from the scanner control unit 6 the information about how many documents are completed using the ADF 6b in the image reading processing, the image data read by the scanner unit 6a, the information about errors occurred in the ADF 6b, etc. The main control unit 9 delivers to the post-processing control unit 8 information about the kind of the sorting processing by the shifter 8a, information about the number of recording paper sheets subjected to the punching processing and the staple binding processing by the puncher 8b and the stapler 8c, etc., while the main control unit 9 acquires from the post-processing control unit 8 the information about errors occurred in the shifter 8a, the puncher 8b, and the stapler 8c.

As described above, the main control unit 9, the HDD 3, the scanner control unit 6, the scanner unit 6a, the print control unit 7, the printer unit 7a, the post-processing control unit 8, and the post-processing executing units 8a to 8c are functional blocks, each of which is formed as a part or a group of parts sectionalized in accordance with the functions.

Figure 2:
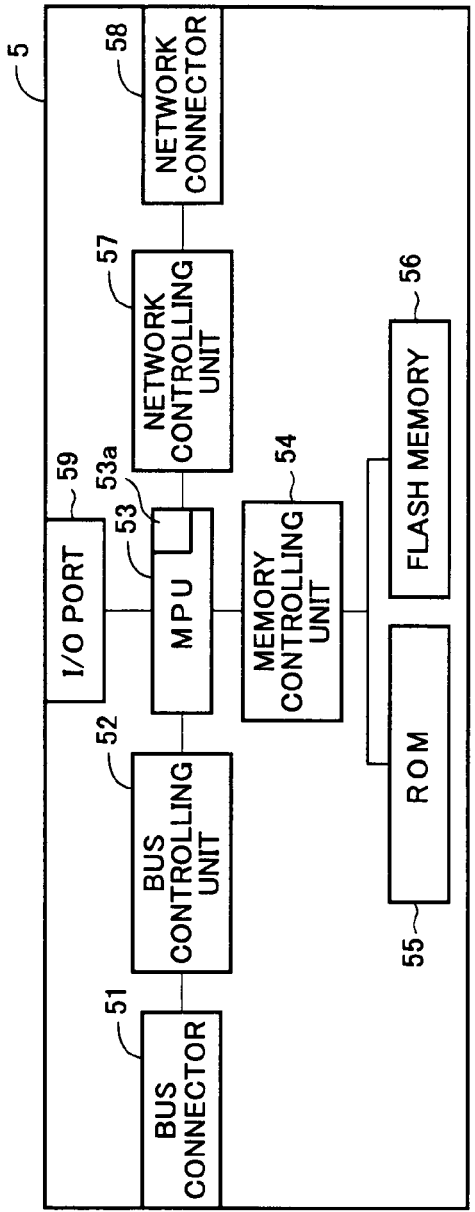
FIG. 2 is a block diagram of the general configuration of an NIC incorporated in the image processing apparatus X.

The structure of the NIC 5 incorporated in the image processing apparatus X will then be described referring to the block diagram of FIG. 2.

The NIC includes a bus connector 51, a bus controlling unit 52, an MPU 53, a memory controlling unit 54, a ROM 55, a flash memory 56, a network controlling unit 57, a network connector 58, and an I/O port 59.

The bus connector 51 is a connector connected to the bus 11, and the bus controlling unit 52 carries out signal transmission to other devices through the bus 11.

The network connector 58 is a connector physically connected to the network 30, and the network controlling unit 57 carries out communication control conforming to a given network protocol of, for example, IEEE standard 802.3, TCP/IP, etc.

The I/O port 59 is connected to an operation detecting switch 1 that is described later and serves as an interface that relays signal transmission between the detecting switch 1 and the MPU 53.

The MPU 53 is a calculating unit that executes a program stored in the ROM 55 beforehand to carry out various processing including relaying signal transmission between the bus 11 and the network 30, and responding to a request for a given process from the host apparatus 32 via the network 30. The program is developed in a RAM (not shown) built in the MPU 53, and is executed. The MPU 53 accesses the ROM 55 or the flash memory 56 via the memory controlling unit 54.

The MPU 53 of the NIC 5 has a clock oscillator 53a that generates oscillation signals with a given period. The MPU 53 of the NIC 5 obtains the current time from the main controlling unit 9 at given timing. Hereinafter, the time obtained in this manner is called the time counting start time. The MPU 53 of the NIC 5 counts the time passed since the time when the time counting start time is obtained from the main controlling unit 9 on the basis of an oscillation signal from the clock oscillator 53a, and computes the present day of the week and the present time on the basis of the time elapsed and the time counting start time. The present day of the week and current time computed by the MPU 53 of the NIC 5 are reset when the NIC 5 is switched off.

The ROM 55 of the NIC 5 stores the programs and data which are executed and referred to by the MPU 53 and of which versions are not scheduled to be updated afterward.

The flash memory 56 of the NIC 5 retains data which is stored and referred to by the MPU 53 in the course of execution of a processing. The data stored in the flash memory 56 and referred to by the MPU 53 include the information of type and version of each firmware stored in a flash memory 66 by each controlling unit 6 to 9, which is described later (an example of version information memory unit).

Figure 3:
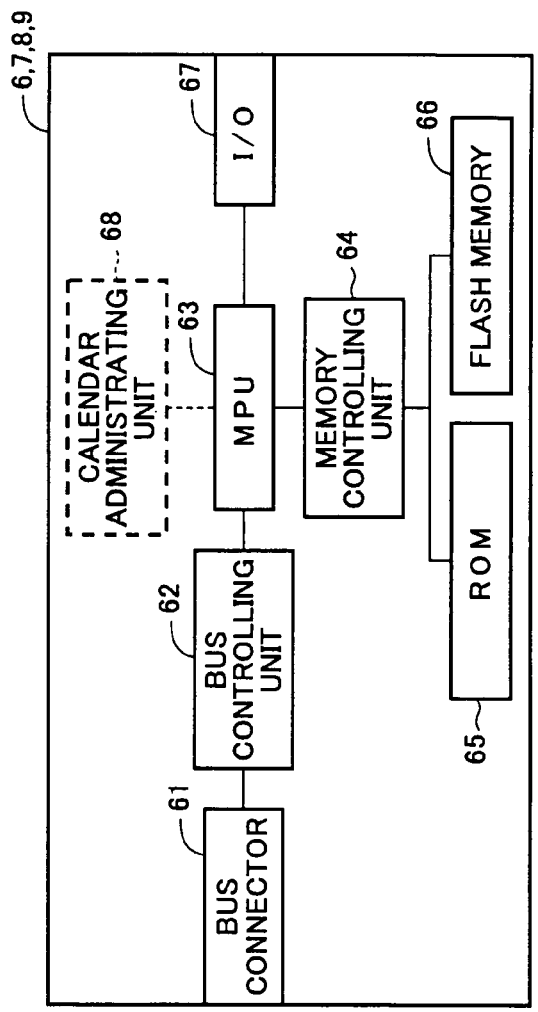
FIG. 3 is a block diagram of the general configuration of a controlling unit incorporated in the image processing apparatus X.

The structures of the main controlling unit 9 and the local controlling units 6 to 8 incorporated in the image processing apparatus X will then be described referring to the block diagram of FIG. 3. Hereinafter, the main controlling unit 9 and local controlling units 6 to 8 are collectively called the controlling unit.

Each of the controlling units 6 to 9 includes a bus connector 61, a bus controlling unit 62, an MPU 63, a memory controlling unit 64, a ROM 65, the flash memory 66, and an I/O port 67.

Each of the bus connector 61, bus controlling unit 62, memory controlling unit 64, ROM 65, and flash memory 66 has the same or similar function as that of the bus connector 51, bus controlling unit 52, memory controlling unit 54, ROM 55, and flash memory 56, which are incorporated into the NIC 5. Of course, it is needless to say that the contents of programs and data stored in the ROM 65 and flash memory 66 are different from those stored in the ROM 55 and flash memory 56 of the NIC 5.

The I/O port 67 of each controlling unit 6 to 9 is connected to a signal line that carries an output control signal from each controlling unit 6 to 9 to a device under control of the control unit, and to a signal line that carries various detected signals from various sensors received by each controlling unit 6 to 9. The I/O port 67 thus serves as an interface relaying between the signal lines and the MPU 63.

For example, the I/O port 67 of the main controlling unit 9 is connected to a signal line leading to devices and sensors composing the operation/display unit 2 and the HDD 3. The I/O port 67 of the scanner controlling unit 6 is connected to a signal line leading to devices composing the scanner unit 6a, such as a motor, light source, and sensor. The I/O port 67 of the print controlling unit 7 is connected to a signal line leading to devices included in the printer unit 7a, such as a motor, sensor, and heater. The I/O port 67 of the post-processing controlling unit 8 is connected to a signal line leading to devices and sensors included in the post-processing executing units 8a to 8c.

The main controlling unit 9 is provided with a calendar administrating unit 68, which has a time counting circuit that counts time. The calendar administrating unit 68 detects the present year, month, day, day of the week, and time on the basis of the time counted by the time counting circuit. The calendar administrating unit 68 is supplied with electric power from a battery charged with the electricity supplied from the first subpower supply 221. The calendar administrating unit 68 continues to operate with power supplied from the battery even if power supply from the first subpower supply 221 to the calendar administrating unit 68 is cut off.

The ROM 65 of each control unit 6 to 9 stores the programs and data which are executed and referred to by the MPU 63 and of which versions are not scheduled to be updated.

The flash memory 66 of each control unit 6 to 9, on the other hand, stores the programs and data which are executed and referred to by the MPU 63 and of which versions may possibly be updated later, such as those of firmware, and the data stored and referred to by the MPU 63 in the course of execution of a processing. Each control unit 6 to 9 executes the firmware (program) stored in the flash memory 66 by the MPU 63 to control devices involved in various image processing.

The information of type and version of the firmware stored in the flash memory 66 of each controlling unit 6 to 9 is transmitted from the controlling unit to the NIC 5 when the controlling unit is in the energized state, and is stored in the flash memory 56 of the NIC 5.

In FIGS. 2 and 3, the flash memories 56 and 66 are depicted as nonvolatile memory unit allowing the MPUs 53 and 63 to write and read data in and from the memory unit. These flash memories 56 and 66 may be replaced with other nonvolatile memory unit, such as EEPROM (Electrically Erasable Programmable Read-Only Memory).

<Information Delivery Server 31>

The information delivery server 31 is a server computer having a Web server function, and is composed of a display unit made up of a liquid crystal display, etc., an operating unit serving as an information input unit made up of a keyboard, mouse, etc., and an MPU and its peripheral devices (ROM, RAM, etc.). The information delivery server 31 includes a calculating unit that carries out various calculations, an NIC serving as a communication unit that communicates with each image processing apparatus X via the network 30, and a hard disc drive (HDD) serving as a memory unit that stores programs and data executed and referred to by the calculating unit.

The information delivery server 31 executes a processing that responds to a request transmitted from the image processing apparatus X via the network 30 by executing a given program stored in the HDD beforehand.

For example, the information delivery server 31, as is described later, when it receives a version check request from the image processing apparatus X, determines whether or not the version for each firmware kept in the controlling units 6 to 9 of the image processing apparatus X is updated, and transmits version updating response information which includes a determination result to the image processing apparatus X that sent the request.

The information delivery server 31, when it receives a request for transmission of the latest version of firmware from the image processing apparatus X, transmits the firmware meeting the request to the image processing apparatus X which sent the request.

[Power Supply System]

An example of the connection of the power supply to each functional block of the image processing apparatus X is described with reference to the power supply system diagram of FIG. 4.

Figure 4:
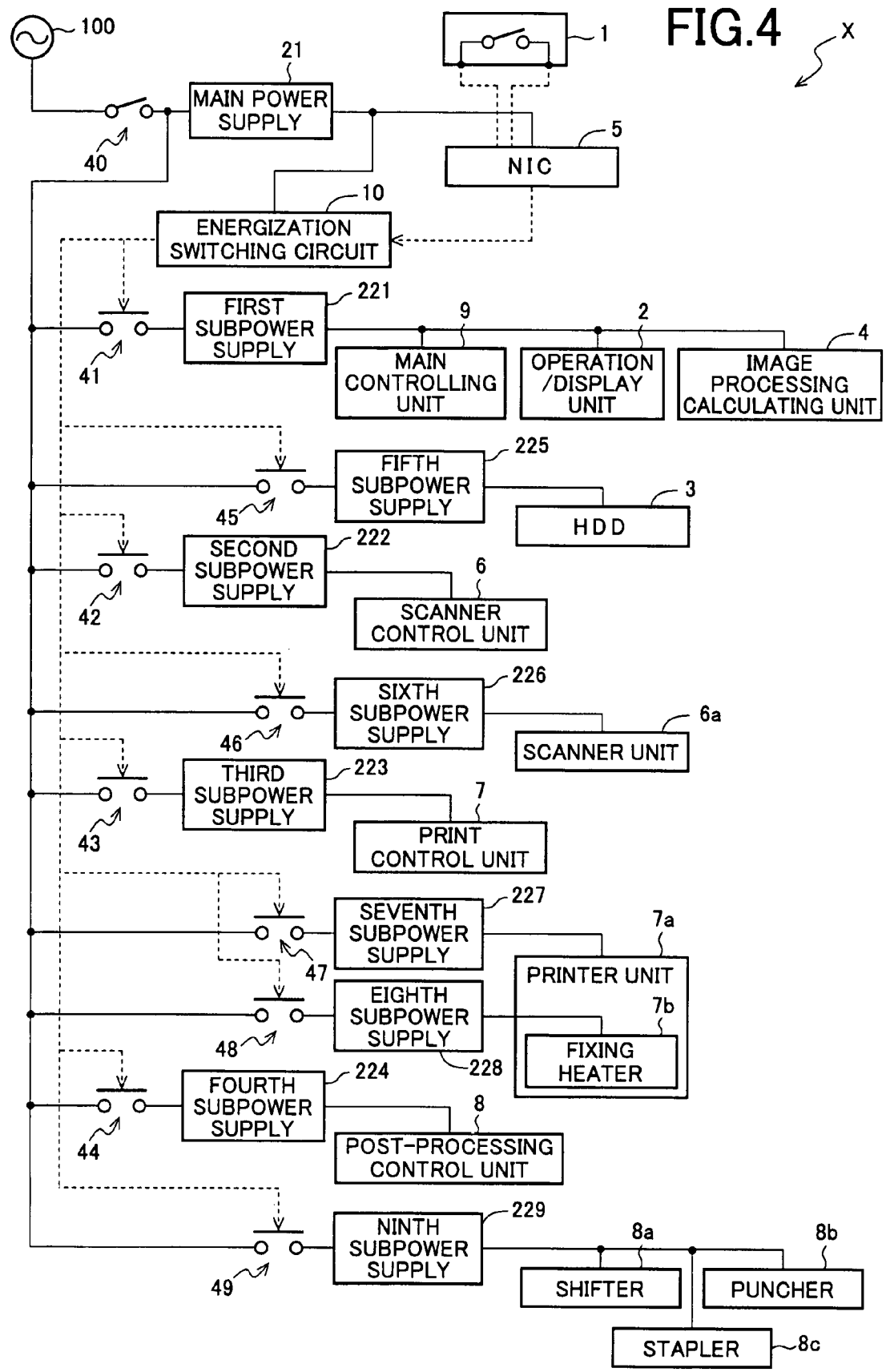
FIG. 4 is a power system diagram depicting a power connection relation in the image processing apparatus X.

In FIG. 4, a power supply line is drawn with a solid line and other signal transmission line is drawn with a broken line.

In the example of FIG. 4, the image processing apparatus X is equipped with the main power supply 21 and nine subpower supplies 22 (hereinafter, called first subpower supply 221 to ninth subpower supply 229).

The main power supply 21 is a power supply for supplying power to the NIC 5 and the energization switching circuit 10.

The main power supply 21 is connected to a commercial power supply 100 that is a basic power source to the whole of the image processing apparatus X by way of a manual switch 40 for switching on and off of the power supply line manually. By the operation of switching of this manual switch 40 by the user, the power supply to the NIC 5 and the energization switching circuit 10 is switched. Therefore, in the state where the image processing apparatus X is connected to the commercial power supply 100, the NIC 5 and the energization switching circuit 10 are always switched on unless the manual switch 40 is switched from on to off by the user. When the manual switch 40 is switched off, the whole of the image processing apparatus X is switched off (stop state).

On the other hand, the first subpower supply 221 is a power supply circuit that supplies power to the main control unit 9, the operation/display unit 2 and image processing calculating unit 4.

The second subpower supply 222, the third subpower supply 223 and the fourth subpower supply 224 are power supply circuits that supply power to the scanner control unit 6, the print control unit 7 and the post-processing control unit 8, respectively.

The fifth subpower supply 225, the sixth subpower supply 226 and the ninth subpower supply 229 are power supply circuits that supply power to the HDD 3, the scanner unit 6a and the post-processing executing units 8a to 8c, respectively.

The seventh subpower supply 227 is a power supply circuit that supplies power to the devices of the printer unit 7a except the fixing heater 7b, and the eighth subpower supply 228 is a power supply circuit that supplies power to the fixing heater 7b.

Each of the first subpower supply 221 to ninth subpower supply 229 is connected to the commercial power supply 100 via the manual changeover switch 40 and automatic changeover switches 41 to 49 which switch on and off of the power supply line according to a given control signal. As shown clearly in FIG. 4, a corresponding relation is established between the automatic changeover switch 41 and the first subpower supply 221, the automatic changeover switch 42 and the subpower supply 222, the automatic changeover switch 43 and the subpower supply 223, the automatic changeover switch 44 and the subpower supply 224, the automatic changeover switch 45 and the subpower supply 225, the automatic changeover switch 46 and the subpower supply 226, the automatic changeover switch 47 and the subpower supply 227, the automatic changeover switch 48 and the subpower supply 228, and the automatic changeover switch 49 and the subpower supply 229.

As a result, each subpower supply 221 to 229 cannot be switched on until the manual changeover switch 40 is switched on and then each automatic changeover switch 41 to 49 is also switched on.

Hereinafter, turning on and cutting off a power supply line is called switching ON and OFF, respectively. Likewise, the states that a power supply line is turned on and cut off are called an ON state and OFF state, respectively.

The automatic changeover switches 41 to 49 function as the energization switching unit that switches on and off of each of the function blocks 6 to 10, 6a, 7a, and 8a to 8c separately according to ON and OFF of each switch.

Hereinafter, when the NIC 5 is in the energized state (manual changeover switch 40 is ON) and all function blocks 6 to 10, 6a, 7a, and 8a to 8c are OFF state (all automatic changeover switches 41 to 49 are OFF), an operation mode of the image processing apparatus X is called a sleep mode. When the NIC 5 and all function blocks 6 to 10, 6a, 7a, and 8a to 8c are ON, an operation mode of the image processing apparatus X is called an operating mode. Under a particular situation, the image processing apparatus X may operate in a stand-by mode (semioperating mode), where the NIC 5 and a part of the entire function blocks only are ON. For example, in the stand-by mode, a part of the entire function blocks, such as the fixing heater 7b and HDD 3 may happen to be OFF.

As shown in FIG. 4, the NIC 5 controls ON and OFF of every automatic changeover switch 41 to 49 through the energization switching circuit 10 to control ON and OFF of each function block separately. The NIC 5, therefore, serves also as a unit that executes ON and OFF control over each function block (data processing unit). In another way, for example, the NIC 5 may control ON and OFF of the main controlling unit 9 and the main controlling unit 9 controls ON and OFF of any function blocks other than itself. In this case, the NIC 5 serves also as a part of the unit that executes ON and OFF control over each function block.

The image processing apparatus X has the operation detecting switch 1 that is turned on and off by a user operation. ON and OFF of the operation detecting switch 1 is detected by the NIC 5. Specifically, the operation detecting switch 1 is connected to the I/O port 59 of the NIC 5, and the MPU 53 of the NIC 5 detects ON and OFF of the operation detecting switch 1 through the I/O port 59.

The operation detecting switch 1 functions as an energization switch that switches the image processing apparatus X into either operating mode or sleep mode.

Specifically, when the operation detecting switch 1 is turned on in the sleep mode, the MPU 53 of the NIC 5 turns on every automatic changeover switch 41 to 49 through control over the energization switching circuit 10 to shift the image processing apparatus X into the operating mode.

When the operation detecting switch 1 is turned off in the operating mode, the MPU 53 of the NIC 5 turns off every automatic changeover switch 41 to 49 through control over the energization switching circuit 10 to shift the image processing apparatus X into the sleep mode unless any kind of data processing is in progress.

According to the image processing apparatus X, when each function block is ON, the MPU 53 of the NIC 5 determines whether or not the following two conditions (hereinafter called "first sleep condition", "second sleep condition") are met. When either of the sleep conditions is met, the NIC 5 controls the energization switching circuit 10 to shift the image processing apparatus X into the sleep mode, where power supply to every function block is cut off. In the sleep mode, every automatic changeover switch 41 to 49 is switched into "OFF" and every function block, which is supplied with power from each of nine subpower supplies 221 to 229, is switched into "non-energized state." As a result, a very few devices including the NIC 5 (NIC 5 and energization switching circuit 10) remain "energized state".

The MPU 53 of the NIC 5 records sleep mode transition reason information that states which one of the first sleep condition and second sleep condition has been met in the flash memory 56 of the NIC 5 when it shifts into the sleep mode.

<First Sleep Condition>

The first sleep condition is the condition that the present date falls onto a time zone set to the sleep mode in a predetermined weekly time schedule (hereinafter called "weekly schedule"). Hereinafter, control of a state of energization of each function block through control over the automatic changeover switches 41 to 49 according to the predetermined weekly schedule (an example of a time schedule) is called weekly timer control. The MPU 53 of the NIC 5 executing the weekly timer control is an example of a schedule controlling unit.

FIG. 5 is a diagram of the contents of a weekly schedule WS for weekly timer control in the image processing apparatus X. In FIG. 5, each square represents a time zone that is fixed by the day of the week (from Monday to Sunday) and time (from 00:00 to 23:00). A blank square represents a time zone set to the sleep mode, and a square marked with "asterisk" represents a time zone set to the operating mode where each function block is energized.

The MPU 53 of the NIC 5 obtains the information of the weekly schedule WS shown in FIG. 5 in advance from the main controlling unit 9, and stores the obtained information in the flash memory 56 in advance.

The MPU 53 of the NIC 5 determines which time zone the present day of the week and time, which is calculated using the clock oscillator 53*a* belongs to the sleep mode time zone or the operating mode time zone in the weekly schedule WS stored in the flash memory 56. According to the result of the determination, the MPU 53 of the NIC 5 controls the automatic changeover switches 41 to 49 through the energization switching circuit 10 switch each function block 6 to 9 from "energized state" to "non-energized state" (shift to the sleep mode), or from "non-energized state" to "energized state" (shift to the operating mode).

The main controlling unit 9 has a weekly schedule setting function that allows the user to set the contents of the weekly schedule WS through control over the operation/display unit 2. The weekly schedule WS set through the weekly schedule setting function is transmitted from the main controlling unit 9 to the NIC 5 and the MPU 53 of the NIC 5 stores the weekly schedule WS in the flash memory 56.

<Second Sleep Condition>

The second sleep condition is the condition that no input operation through the operation/display unit 2 exists when the first sleep condition is not met and any data from a host apparatus 32 through the network 30 have not been received for a given time or longer.

For example, when the NIC 5 determines whether or not the second sleep condition is met, the MPU 53 of the NIC 5 detects the presence of input operation to the operation/display unit 2 via the main controlling unit 9 and the bus 11, and also detects the presence of data reception from the host apparatus 32 via the network controlling unit 57.

By counting time based on oscillation signals from the clock oscillator 53*a*, the MPU 53 of the NIC 5 detects a fact that no input operation through the operation/display unit 2 exists and any data from the host apparatus 32 through the network 30 has not been received for a given time or longer. According to the detected fact, the MPU 53 of the NIC 5 controls the automatic changeover switches 41 to 49 through the energization switching circuit 10 to switch each function block from "energized state" to "non-energized state" (from operating mode into the sleep mode).

Figure 6:
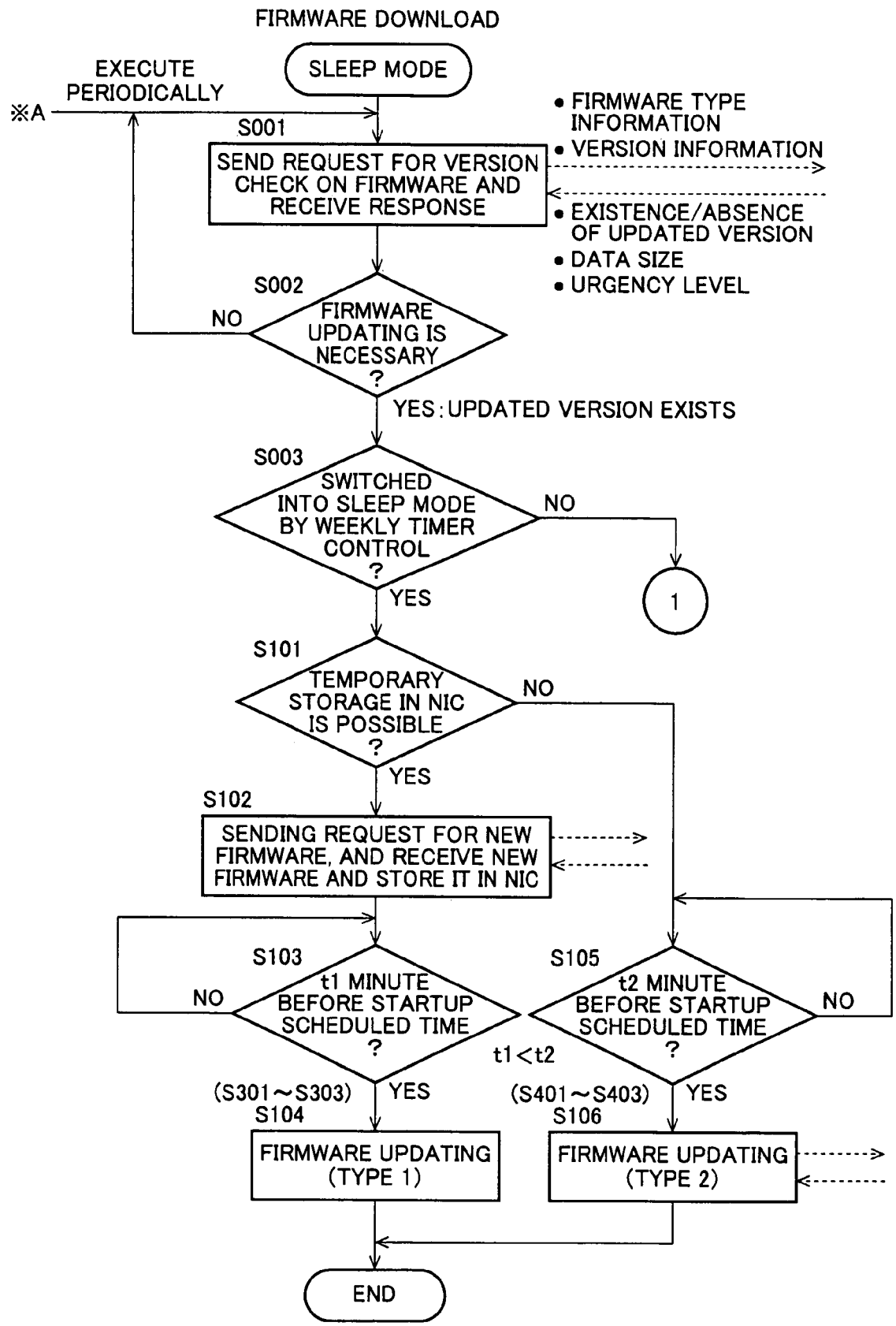
FIG. 6 is a flowchart representing a part of the procedures of firmware download processing in the image processing apparatus X.

A procedure of a firmware download processing executed by the image processing apparatus X will then be described referring to flowcharts shown in FIGS. 6 and 7. The processing shown in FIGS. 6 and 7 is executed when the image processing apparatus X is in the sleep mode, where power supply to each function block is cut off. In the following description, S001, S002, - - - are reference numerals representing the procedure (steps).

<Step S001>

At the start of the procedure, the NIC 5 of the MPU 53 transmits a version check request to the information delivery server 31 trough the network controlling unit 57 and the network 30, and receives the version updating response information, which is a replay to the version check request, from the information delivery server 31 (S001).

In this step, the MPU 53 of the NIC 5 refers to the type information and version of firmware kept in each controlling unit 6 to 9 stored in the flash memory 56 of the NIC 5 beforehand, and adds the information to the version check request. This version check request is a request for the information delivery server 31 to determine whether or not the version of the firmware kept in each controlling unit 6 to 9 is the latest.

A processing executed by the information delivery server 31 when it receives the version check request is described.

Receiving the version check request, the information delivery server 31 first identifies the type of firmware to be checked on the basis of the firmware type information included in the version check request.

The information delivery server 31 then compares the version information of the latest one of the identified type of firmware and each of version information included in the version check request and each of version information of the latest firmware (firmware corresponding to the type information) stored in the HDD of the information delivery server 31. Through this comparison, the information delivery server 31 determines whether or not an updated version of the firmware to be checked is present.

The information delivery server 31 thus transmits (sends a response of) the version updating response information containing a result of the determination to the image processing apparatus X that sent the request.

Regarding firmware of which an updated version is determined to be present, the information delivery server 31 transmits the version updating response information including the type information of the firmware and the result of determination on the presence/absence of the updated version of the firmware, the data size of the latest firmware with updated version and a level of urgency of updating the firmware to the latest version to the image processing apparatus X. The updating urgency level is provided as information indicating urgency level of, for example, "high", "middle", and "low".

The type information and version information of the latest firmware and the updating urgency level information are stored in the HDD of the information server 31 for each firmware beforehand.

<Step S002>

Receiving the response (replay) from the information delivery server 31, the MPU 53 of the NIC 5 then determines whether the firmware kept in each controlling unit 6 to 9 of the image processing apparatus X must be updated to the latest version of the firmware on the basis of the contents of the response (the version updating response information) (S002). Specifically, the MPU 53 of the NIC 5 determines, for each controlling unit 6 to 9, that firmware updating is necessary if an updated version is present, and that firmware updating is unnecessary if an updated version is not present.

In this manner, when each controlling unit 6 to 9 is in "non-energized state" (in the sleep mode), the MPU 53 of the NIC 5 determines whether updating of the firmware kept in each controlling unit 6 to 9 is necessary or not (S002: an example of the updating necessary/unnecessary determining unit) by referring to the information stored in the flash memory 56 (an example of the version information memory unit) (S001) and communicating with the information delivery server 31 (S001) through the network controlling unit 57, (an example of the communication circuit) of the NIC 5.

When firmware updating is determined to be unnecessary through the processing at step S002 in the sleep mode, the MPU 53 of the NIC 5 periodically repeats the processing of steps S001 and S002.

When firmware updating is determined to be necessary through the processing at step S002, the MPU 53 of the NIC 5 proceeds the processing to the next step S003.

<Step S003>

At step S003, the MPU 53 of the NIC 5 determines whether transition to the present sleep mode (where the controlling units 6 to 9 are in the non-energized state) is caused by the weekly timer control (an example of the schedule control processing), that is, caused by the satisfaction of the first sleep condition (S003: an example of a schedule control state determination). This determination is made on the basis of the sleep mode transition reason information that is stored in the flash memory 56 by the MPU 53 of the NIC 5 upon shifting to the sleep mode.

At step S003, the MPU 53 of the NIC 5 proceeds the processing to step S101 when it determines that the present sleep mode is caused by the weekly timer control, and proceeds the processing to step S201 (FIG. 7) when it determines otherwise.

<Step S101>

At step S101, the MPU 53 of the NIC 5 compares the data size information included in the version updating response information and a spare capacity of the flash memory 56 to determine whether firmware determined necessary to be updated can be stored temporarily in the flash memory 56 (S101).

The MPU 53 of the NIC 5 proceeds the processing to step S102 when it determines that the temporary storage is possible, and proceeds the processing to step S105 when it determines otherwise.

<Steps S102 to S104>

At step S102, the MPU 53 of the NIC 5 transmits a transmission request for the latest version of the firmware determined necessary to be updated to the information delivery server 31 through the network controlling unit 57, and receives (obtains) the latest version of the firmware returned to through the network controlling unit 57. The received latest firmware is stored temporarily in the flash memory 56 (an example of a control information temporarily memory unit) (S102).

The MPU 53 of the NIC 5 then keeps standing ready for an updating process on the controlling units 6 to 9, which are the objects of firmware updating, until the time preceding to the next startup scheduled time (date) by a given time t1 (minute) (t1 minute before the startup scheduled time), where the scheduled time is determined by the weekly timer control based on the weekly schedule WS (S103). For example, the MPU 53 of the NIC 5 keeps standing ready until 07:50 on the next day even if the processing at step S101 ends at 21:00 on the day providing that the next startup scheduled time is 08:00 on the next day and the preset time t1 is 10 minutes. Upon detecting that the time is t1 minutes before the startup scheduled time, the MPU 53 of the NIC 5 executes a given firmware updating processing (type 1) (S104), and ends the firmware downloading processing.

The firmware updating processing (type 1) at step S104 (S301 to S303) will then be described referring to the flowchart shown in FIG. 8.

The MPU 53 of the NIC 5 first starts up only the controlling unit of the controlling units 6 to 9 that corresponds to the firmware determined necessary to be updated at step S002 through control over the energization switching circuit 10 (S301: an example of a controlling unit automatic starting unit). And then only the controlling unit necessary for updating the firmware is switched into "energized state".

Subsequently, the MPU 63 of the started controlling unit obtains the latest version of the firmware (new firmware), which is stored temporarily in the flash memory 56 of the NIC 5, through the MPU 53 of the NIC 5 and the bus 11, and updates the firmware already stored in the flash memory 66 of the controlling unit to the latest version of the firmware obtained from the NIC 5 (S302). The MPU 63 of the controlling unit carries out the firmware updating when it receives a firmware updating command (type 1) from the MPU 53 of the NIC 5 through the bus 11.

Finally, following the firmware updating, the MPU 53 of the NIC 5 deletes the firmware stored temporarily in the flash memory 56 of the NIC 5 (S303).

The MPU 53 of the NIC 5 executing the processing at step S102 and the MPU 63 of the controlling unit executing the processing at step S302 constitute an example of a control information updating unit that obtains the new firmware (an example of control information) from the external information delivery server 31, and updates the firmware kept in the controlling unit switched into "energized state" to the new firmware.

<Steps S105, S106>

When the MPU 53 of the NIC 5 determines that the firmware in a need of updating cannot be stored temporarily in the flash memory 56 at step S101, the MPU 53 keeps standing ready for the updating processing on the controlling units 6 to 9, which are the objects of firmware updating, until the time preceding to the next startup scheduled time (date) by a given time t2 (minute) (t2 minute before the startup scheduled time), where the scheduled time is determined by the weekly timer control based on the weekly schedule WS (S105). For example, the MPU 63 of the NIC 5 keeps standing ready until 07:45 on the next day even if the processing at step S101 ends at 21:00 on the day providing that the next startup scheduled time is 08:00 on the next day with the preset time t2 of 15 minutes.

Upon detecting that the time is t2 minute before the startup scheduled time, the MPU 53 of the NIC 5 executes a given firmware updating processing (type 2) (S106) and ends the firmware downloading processing.

The firmware updating processing (type 2) at step S106 (S401 to S403) is described referring to the flowchart shown in FIG. 9.

The MPU 53 of the NIC 5 first starts up only the controlling unit of the controlling units 6 to 9 that corresponds to the firmware determined necessary to be updated at step S002 through control over the energization switching circuit 10 (S401: an example of the controlling unit automatic starting unit). And then only the controlling unit necessary for updating the firmware is switched into "energized state".

Subsequently, the MPU 63 of the started controlling unit transmits a transmission request for the latest version of the firmware to the information server 31 through the NIC 5 (S402).

The MPU 63 of the controlling unit then receives the latest version of the firmware, which is sent from the information server 31 as a reply to the request, through the NIC 5, and replaces the firmware already stored in the flash memory 66 of the controlling unit with the received latest version of firmware from the information server 31 (S403). The MPU 63 of the controlling unit carries out the firmware transmission request and firmware reception/updating when it receives a firmware updating command (type 2) from the MPU 53 of the NIC 5 through the bus 11.

As described above, according to this firmware updating processing (type 2), the MPU 63 of the controlling unit obtains the new firmware through the NIC 5 and, at the same time, updates the firmware kept in the controlling unit after the controlling unit has been switched into "energized state" through the processing by the MPU 53 of the NIC 5 (an example of a first control information updating unit).

<Step S201>

At step S003, when the MPU 53 of the NIC 5 determines that transition into the present sleep mode is not cause by the weekly timer control, the MPU 53 further determines whether the updating urgency level is high or not with respect to the firmware that is determined necessary to be updated at step S002 (S201: an example of an updating urgency level determining unit). This determination is a determination whether or not the updating urgency level contained in the version updating response information from the information delivery server 31 is "high".

When determining that the updating urgency level is not high, the MPU 53 of the NIC 5 returns the processing to step S001. Specifically, when the image processing apparatus X is switched into the present sleep mode not by the weekly timer control (but by the satisfaction of the second sleep condition) and the updating urgency level is not high, the apparatus X does not execute the processing of starting up each controlling unit 6 to 9 in "non-energized state" to update the firmware.

<Step S202>

A step S201, when the MPU 53 of the NIC 5 determines that the updating urgency level is high, the MPU 53 determines, as does at step S101, whether or not the firmware determined necessary to be updated at step S002 can be stored temporarily in the flash memory 56 (S202).

When determining that temporarily storage of the firmware is possible at step S202, the MPU 53 of the NIC 5 sends the request for the latest version of firmware to the information server 31, receives the latest version of firmware sent back from the server 31, and stores the receives firmware temporarily in the flash memory 56, as does at step S102 (S203).

The Image processing apparatus X then executes the firmware updating processing (type 1) (S301 to S303), as dose at step S104 (S204).

When determining that temporarily storage of the firmware is impossible at step S202, on the other hand, the Image processing apparatus X executes the firmware updating processing (type 2) (S401 to S403), as dose at step S106 (S205)

Following the end of the firmware updating processing (type 1) at step S204 or firmware updating processing (type 2) at step S205, the MPU 53 of the NIC 5 shifts the image processing apparatus X into the sleep mode again through control over the energization switching circuit 10 (S206), and then returns the processing to step S001.

In this manner, when determines that the image processing apparatus X is switched into the sleep mode not by the weekly timer control, the MPU 53 of the NIC 5 changes "energized state" of the started controlling unit back into "non-energized state" again through control over the energization switching circuit 10 after it executed the updating processing of firmware kept in the controlling unit (S202 to S205) (S206: an example of a controlling unit automatic suspending unit).

The following is a supplementary explanation of the processing shown in FIGS. 6 to 9.

Upon determining that updating of the firmware is needed at step S002, the MPU 53 of the NIC 5, in principle, carries out the control to automatically start up a necessary controlling unit of the controlling units 6 to 9 and update the firmware (S104, S106) only when it determines that the transition to the present sleep mode (where the controlling units 6 to 9 are not energized) is caused by the weekly timer control (an example of the process by the schedule controlling unit) (S003: an example of an updating execution control).

Usually, the image processing apparatus X enters into the sleep mode at night and on holiday under the weekly timer control. Updating firmware while the image processing apparatus X is in the sleep mode under the weekly timer control, therefore, lowers a possibility of the arising of a new image processing request during updating of the firmware. This avoids such a case to the utmost that the processing of a new image processing request generated during updating of the firmware is delayed in execution.

The MPU 53 of the NIC 5, however, updates firmware of which the updating urgency level is determined (S201) high even when it determines that the image processing apparatus X is switched into the sleep mode not by the weekly timer control (S202 to S205: an example of the updating execution control).

Thus, firmware is updated promptly if an updated version of the firmware is carried out at a high level of urgency in remedying a grave defect of the firmware that might lead to a data loss.

When the MPU 53 of the NIC 5 determines that the image processing apparatus X is switched into the sleep mode by the weekly timer control, the MPU 53 switches a controlling unit into "energized state" to carry out the firmware updating at the time when it is a given time (t1 minute, t2 minute) before the next startup scheduled time for the controlling unit determined by the weekly timer control (schedule control) (S104, S106).

In this manner, the preset times t1, t2 are given as the times that are sufficient to ensure the firmware updating. This allows the image processing apparatus X to end updating of the firmware of each controlling unit 6 to 9 almost at the same time as the next startup scheduled time for the controlling unit determined by the weekly timer control. As a result, even if the controlling unit is kept in "energized state" until the next startup scheduled time determined by the weekly timer control after the firmware updating processing is finished, power consumption in the image processing apparatus X during the period between the end of firmware updating and the startup scheduled time is reduced to a minimum. Actually, keeping the controlling unit in "energized state" results in power consumption less than that resulting from suspending power supply to the controlling unit and restarting the controlling unit.

The preset time t1 is the time that each controlling unit 6 to 9 takes to start (S301) and obtain firmware stored temporarily in the flash memory 56 of the NIC 5 and carry out the updating processing (S302).

The preset time t2 is the time that each controlling unit 6 to 9 takes to start (S401) and obtain firmware from the information delivery server 31 and, at the same time, carry out the updating processing (S402, S403). Normally, therefore, t1 and t2 has the relation t1<t2.

The preset times t1 and t2 may be determined in advance, or the MPU 53 of the NIC 5 may determine (calculate) the preset times t1 and t2 according to the size of the latest version of firmware on a case by case basis.

When a spare capacity of the flash memory 56 is sufficient, the MPU 53 of the NIC 5 obtains new firmware through the network controlling unit 57 of the NIC 5 before a controlling unit is switched into "energized state", and stores the new firmware temporarily in the flash memory 56 (S102, S203). After the controlling unit is switched into "energized state", the MPU 53 replaces the firmware kept in the flash memory 66 of the controlling unit with the new firmware temporarily stored in the flash memory 56 of the NIC 5 (S104, S204: an example of a second control information updating).

This processing reduces a time required for keeping the controlling unit in "energized state" for the firmware updating even when the processing of obtaining the firmware from the information delivery server 31 through the network 30 takes a relatively long time, and power consumption in the image processing apparatus X is reduced.

The MPU 53 of the NIC 5 obtains size information of the latest version of firmware, which is kept in the information delivery server 31, from the information delivery server 31 through the network controlling unit 57 of the NIC 5 (S001). Based on a comparison of the size information and a spare capacity of the flash memory 56 of the NIC 5, the MPU 53 then makes a choice on which of the processing at steps S106 or at step S206 (an example of a processing of the first control information updating unit) or the processing at steps S102 to S104 or at steps S202 to S204 (an example of a processing of the second control information updating unit) is executed to obtain and update new firmware (S102, S202: an example of a control information updating control).

This allows the image processing apparatus X to carry out firmware updating processing even if a spare capacity of the flash memory 56 of the NIC 5 is insufficient.

On the other hand, the image processing apparatus X may be provided with the flash memory 56 having a sufficiently large capacity to be able to obtain and update new firmware always with the processing at steps S102 to S104 or at steps S202 to S204.

On the contrary, the image processing apparatus X may be so constructed as to obtain and update new firmware always with the processing at steps S106 or at step S205.

The MPU 53 of the NIC 5 separately executes individual processing including determining whether or not firmware updating is necessary (S002), starting up a controlling unit determined to be in a need of firmware updating (S301, S401), and updating firmware kept in the controlling unit (S302, S403) on each of the controlling units 6 to 9 that can be energized independently of each other and starts up only the controlling unit in a need of firmware updating.

This avoids wasteful power consumption in controlling units that are unnecessary for firmware updating.

The NIC 5 (communication unit) of the image processing apparatus X serves as the circuit that determines whether or not firmware updating is necessary (S001, S002) and also as the circuit that automatically starts up each controlling unit 6 to 9 (S301, S401). This allows a reduction in power consumption of the image processing apparatus X in the sleep mode.

The image processing apparatus X described above transmits version information of firmware of each controlling unit 6 to 9 to the information delivery server 31 through the NIC 5 (S001), and determines whether or not firmware updating is necessary on the basis of the version updating response information (S002). This is a case where the information delivery server 31 carries out a version comparison.

In contrast, in another embodiment, the NIC 5 obtains version information of firmware kept in the information delivery server 31 from the server 31, and compares the obtained information and the version information stored in the flash memory 56 of the NIC 5 so that the MPU 53 of the NIC 5 executes the processing of determining whether or not firmware updating is necessary. This is a case where the image processing apparatus X carries out the version comparison of the firmware in the image processing apparatus X and the firmware in the information delivery server 31.

The image processing apparatus X described above, in execution of the processing at steps S401 to S403, starts up only the controlling unit determined to be in a need of firmware updating of the suspended controlling units 6 to 9 (S401), and causes the started controlling unit to execute the processing of sending a request for the latest version of firmware to the information delivery server 31 (S402) and the processing of receiving the latest version of firmware (S403).

In contrast, when a controlling unit in a need of firmware updating is any one of the local controlling units 6 to 8, the image processing apparatus X may execute the following processing at steps S401 to S403, in which processing steps S401' to 403' correspond to steps S401 to S403, respectively.

The MPU 53 of the NIC 5 starts up the main controlling unit 9 and a local controlling unit in a need of firmware updating of the local controlling units 6 to 8 trough control over the energization switching circuit 10 (S401'). That is, the first subpower supply 221 and one or more of the second subpower supply 222 to forth subpower supply 224 are switched into ON state.

The started main controlling unit 9 then executes the processing of sending a request for the latest version of firmware to the information delivery server 31 (S402') in the same manner as that at step S402, and the processing of receiving the latest version of firmware as well (S403'). The received firmware is stored temporarily in the flash memory 66 of the main controlling unit 9.

Subsequently, at step S403', the MPU 63 of the started local controlling unit obtains the firmware stored temporarily in the flash memory 66 of the main controlling unit 9 in the same manner as the processing at step S302, and executes updating processing of firmware of the started local controlling unit (S403').

In the image processing apparatus X carrying out such processing, each local controlling unit 6 to 8 does not have to store a program, etc., for the communication processing for obtaining firmware from the information delivery server 31. This enables a reduction in the memory capacity of the ROM 55, etc., incorporated in each local controlling unit 6 to 8, and leads to a cutdown in manhour for developing a program involved in the communication processing with the information delivery server 31.

The present invention is applicable to image processing apparatuses.

The image processing apparatus according to the present invention starts the control information updating processing when the controlling unit is in the non-energized state, where the controlling unit is not engaged in an image processing. This prevents a trouble that an ongoing image processing is suspended for execution of the control information updating processing.

The image processing apparatus according to the present invention starts the control information updating processing in the power-saving state. This avoids a case to the utmost where a new image processing request is delayed due to the control information updating processing.

The image processing apparatus according to the present invention determines whether or not updating control information is necessary while in the power-saving state, where the controlling unit is not supplied with power, and automatically starts up the controlling unit as required to execute the updating processing on control information. This allows the image processing apparatus to maintain the power-saving state until night or early morning when an image processing request seldom arises if the control information updating processing is carried out at such time. As a result, the power consumption in the image processing apparatus is reduced substantially.

The invention claimed is:

1. An image processing apparatus having a memory unit that keeps control information used for its control and equipped with a controlling unit that controls a given device on the basis of the control information and a communication unit that communicates with a given external device that keeps the control information to be supplied to the controlling unit comprising:
  a controlling unit energization switching unit that practices the switching over energizing/non-energizing for the controlling unit independently of the energization of the communication unit;
  a version information memory unit that stores version information of control information kept in the controlling unit;
  an updating necessary/unnecessary determining unit that determines whether updating of the control information kept in the controlling unit is necessary or not by referring to the information stored in the version information memory unit and by communicating with the external device via the communication unit when the controlling unit is in a non-energized state;
  a controlling unit automatic starting unit that switches the controlling unit into an energized state by controlling the controlling unit energization switching unit when the updating necessary/unnecessary determining unit determines that updating of the control information is necessary; and
  a control information updating unit that obtains new control information from the external device via the communication unit and replaces the control information kept in the controlling unit which has been switched into the energized state by the controlling unit automatic starting unit with the new control information, when the updating necessary/unnecessary determining unit determines that updating of the control information is necessary.

2. The image processing apparatus as defined in claim 1, wherein
  the controlling unit is composed of one or more controlling units that can be switched individually into energizing/non-energizing state by the controlling unit energization switching unit, and wherein
  each of the updating necessary/unnecessary determining unit, controlling unit automatic starting unit, and control information updating unit executes each of its processing separately to each of the controlling units.

3. The image processing apparatus as defined in claim 1 or 2, wherein
  the control information updating unit has a first control information updating unit that obtains the new control information via the communication unit and, at the same time, updates the control information kept in the controlling unit after the controlling unit is switched into the energized state by the control unit automatic starting unit.

4. The image processing apparatus as defined in claim 1 or 2, comprising a control information temporary memory unit that temporarily stores the new control information obtained from the external device, wherein
  the control information updating unit has a second control information updating unit that obtains the new control information via the communication unit and stores it in the control information temporary memory unit before the control unit is switched into the energized state by the controlling unit automatic starting unit, and replaces the control information kept in the controlling unit switched into the energized state with the new control information stored in the control information temporary memory unit.

5. The image processing apparatus as defined in claim 4, comprising both first and second control information updating units, and
  control information updating controlling unit that obtains size information of the control information from the external device via the communication unit, the control information being kept in the external device, and makes a choice on which of the first or second control information updating unit is used to obtain and update the new control information based on a comparison of the size information and a spare capacity of the control information temporary memory unit.

6. The image processing apparatus as defined in claim 1 or 2, comprising:
  a schedule controlling unit that controls a energization state of the controlling unit by controlling the controlling unit energization switching unit according to a predetermined time schedule;
  a schedule control state determining unit that determines whether the controlling unit, when it is in non-energized state, has been brought into the non-energized state by the schedule controlling unit, the determination being made when the controlling unit is in the non-energized state; and an updating execution controlling unit that controls a determination on execution or nonexecution of a processing each by the controlling unit automatic starting unit and the control information updating unit based on a determination result given by the schedule control state determining unit when the updating necessary/unnecessary determining unit determines that updating of control information is necessary.

7. The image processing apparatus as defined in claim 6, comprising an updating urgency level determining unit that determines an urgency level of updating of control information when the updating necessary/unnecessary determining unit determines that updating of the control information is necessary, wherein the updating execution controlling unit controls a determination on execution or nonexecution of a processing by the controlling unit automatic starting unit and by the control information updating unit based on a determination result given by the schedule control state determining unit and a determination result given by the updating urgency level determining unit when the updating necessary/unnecessary determining unit determines that updating of the control information is necessary.

8. The image processing apparatus as defined in claim 6, wherein the controlling unit automatic starting unit switches the controlling unit into the energized state a given time before a next startup scheduled time of the controlling unit determined by the schedule controlling unit.

9. The image processing apparatus as defined in claim 1 or 2, comprising a controlling unit automatic suspending unit that switches the controlling unit into the non-energized state by controlling the controlling unit energization switching unit after the control information kept in the controlling unit has been updated by the control information updating unit.

10. The image processing apparatus as defined in claim 1 or 2, wherein the communication unit has both functions of the updating necessary/unnecessary determining unit and the controlling unit automatic starting unit.

\* \* \* \* \*